G. W. BROWN.
Corn-Planter.
No. 1,091. Reissued Dec. 11, 1860
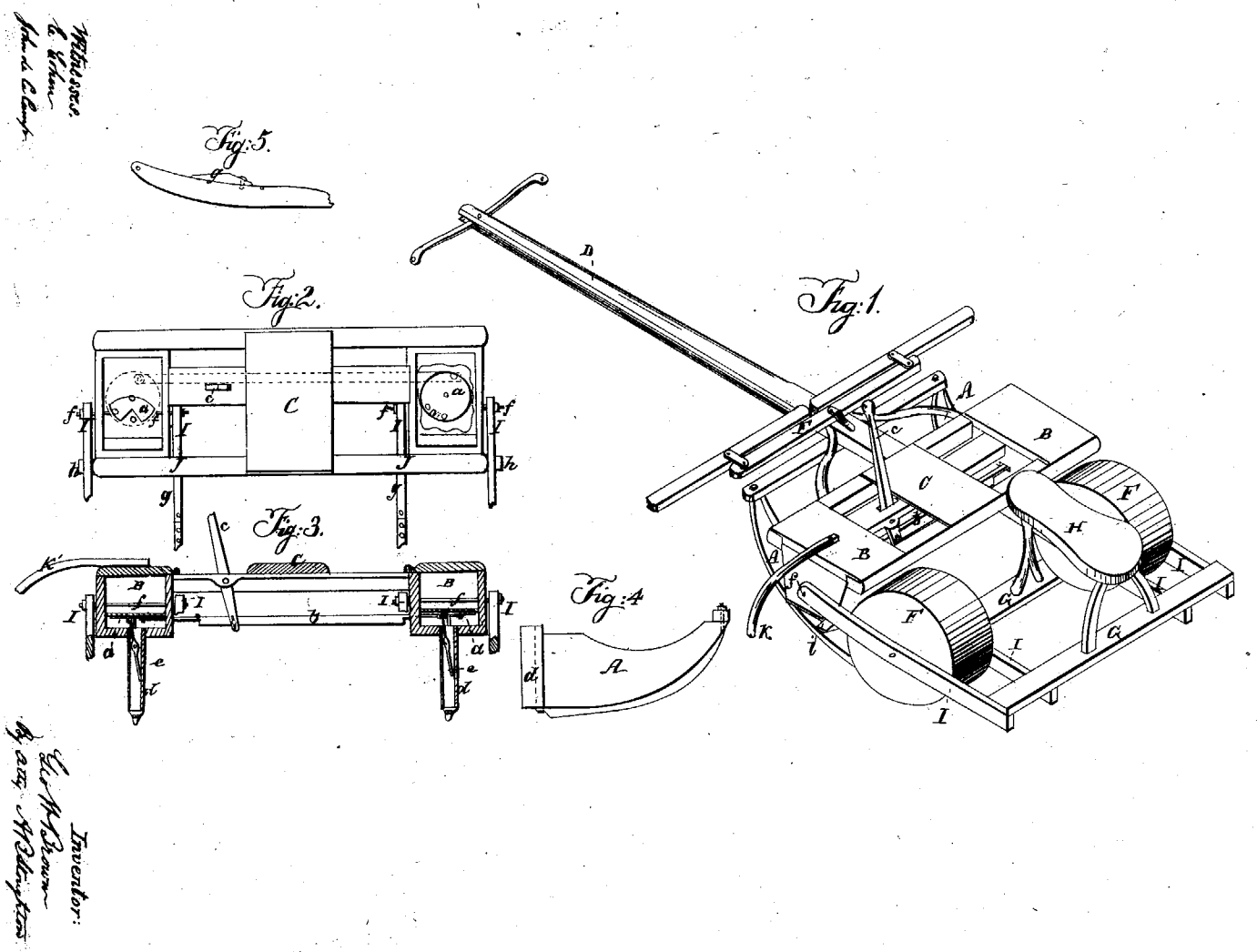
Witnesses.
C. Cohen
John de C. Camp
Inventor:
Geo W. Brown
By atty A. P. Edrington
N. PETERS, PHOTO-LITHOGRAPHER, WASHINGTON, D. C.

UNITED STATES PATENT OFFICE.

GEO. W. BROWN, OF GALESBURG, ILLINOIS.

IMPROVEMENT IN SEED-PLANTERS.

Specification forming part of Letters Patent No. 12,811, dated May 8, 1855; Reissue No. 508, dated November 10, 1857; Reissue No. 1,091, dated December 11, 1860.

DIVISION A.

*To all whom it may concern:*

Be it known that I, GEORGE W. BROWN, of Galesburg, in the county of Knox and State of Illinois, have invented certain new and useful Improvements in Seed-Planters; and I do hereby declare that the following is a full, clear, and exact description of the same, reference being had to the accompanying drawings, making a part of this specification, in which—

Figure 1 represents a perspective view of the machine complete. Fig. 2 represents a top plan of the seed hoppers and valves and framework supporting them. Fig. 3 represents a vertical transverse section through the seed hoppers, valves, and runners or shoes, and showing a device for operating the valves, also representing parts of the frame for supporting them, as well as the marker. Fig. 4 represents a side elevation of one of the runners. Fig. 5 represents the lock or block for defining or adjusting the descent of the rear part of the frame.

Similar letters of reference, where they occur in the several figures, denote corresponding parts of the machine in all the drawings.

In the machine originally patented to me on the 2d day of February, 1853, and afterward reissued, many of the leading characteristics of the present invention may be found; but in my former invention I only mounted one person on the machine, where he could ride and better overlook his work, the other attendant walking upon the ground. In my present machine I mount both the seed slide or valve operator and the driver on the machine, so that both can ride and without inconveniencing each other. This I find to be the most desirable, and is preferred by the farmers.

The nature of this invention consists, in connection with a seed-planting machine that is operated by hand, in the placing of both the driver and the person who operates the seed slides or valves upon the machine in such positions that each may attend to his particular duty without interfering with the duties of the other; and it further consists, in connection with a seed-planting machine that is operated by hand, and upon which the driver and the person who operates the seed-slides sit or stand, in the so locating of said seats or stands as that the weight of one of the persons may be used to counterbalance or overbalance the weight of the other, for the purpose of more readily raising or lowering the seeding apparatus.

To enable others skilled in the art to make and use my invention, I will proceed to describe the same with reference to the drawings.

A A represent a pair of runners or shoes having their edges inclined upward, so as to mount up or climb over or break or cut through intervening obstacles to their free passage through or over the ground. These runners are made thin at front and gradually widen out toward their rear ends, so as to open a gash or furrow wide enough to receive the grains that are to be planted therein and without much lateral displacement of the soil or any tendency of the mucky or sticky soils to adhere to them, and thus clog up the machine and cause it to make rough or irregular openings for the seed. These runners are united by suitable cross-pieces to form a frame-work, upon which are mounted the seed-hoppers B B, and a seat or stand, C, for the person who works the seed slides or valves *a a* to occupy or ride upon.

D is the tongue, and E the double-trees, to which the team is hitched in the usual way.

The valves *a a* are united by a cross-bar, *b*, to which a lever, *c*, is attached, said lever being in convenient position for the operator to grasp and work from his seat or stand C. Instead of the grains dropping from the seed slides or valves *a a* in the hopper down into the gash or furrow at one single fall, there may be a second set of valves, *e e*, Fig. 3, extending down into the seed ducts or tubes *d d*, which catch the grains that drop from the hoppers and allow those just previously dropped and caught to fall into the furrow. This is more particularly advantageous when the hoppers set high up above the ground, as the machine will not advance so far over the ground during the time consumed in the falling of the grain, and consequently the operator can better gage the dropping into the exact spot, and thus preserve straight rows for the after cultivation.

F F are a pair of supporting-wheels, and, for convenience, are also made to travel in the path of the runners, so as to press down the earth upon the planted seeds. Upon the journals or axles of these wheels is supported the rear portion of the frame-work G of the machine, and upon which rear portion of the frame-work the driver's seat H is placed. This seat extends back of the axle or centers of the wheels F, or so that the driver or occupant of the rear seat by moving himself or throwing his weight forward or backward may force the seeding apparatus into or raise it from the ground for planting deeper, or for raising to surmount any obstacle, or for turning the machine around at the end of the furrow or "through."

The side pieces, I I, connecting the front and after portions of the frame, may be united in front by rods or bolts *f*, so as to form a hinged connection and leave some play between said front and rear portions, and a lock, block, or stop, *h*, arranged, against which the levers I I catch or stop to prevent the rear of the frame from descending so low as to strike the ground or inconvenience the driver or occupant of the seat H. *g* are adjustable purchase-blocks on the inside levers, I, as seen at Fig. 5, which take under the frame of the seeding apparatus, so as to define or adjust the extent to which said seeding apparatus may be raised or lowered. The pieces I I serve as levers by which the driver or occupant of the rear seat by his weight or his position, or both, can raise up or let or force down the seeding apparatus, shoes, or seed-ducts, as will be clearly understood by reference to the drawings. The driver or occupant of the rear seat, too, by changing the position of his person or weight can balance, counterbalance, or overbalance the weight of the person who sits or stands in front, thus controlling the machine, raising up or letting down, when necessary to do so, the seeding apparatus by simply moving his person or throwing his weight backward or forward, as the case may be.

The person who works the seed-slides may sit or stand facing the previously-made furrows or marks on the ground, which guide him in his operations, and, sighting by an indicator, K, moves his lever *c* when the indicator points over the previously-made mark, and thus successively drop the charges of grain in rows or straight lines, so as to be readily cultivated afterward.

It is obvious that so long as I have two seats on the machine it is immaterial upon which one the driver sits or upon which one the seed-slide operator sits, as they may change seats and still work and conduct the machine in the same way.

The tongue D is rigidly fixed to the front frame, and the rear frame being hinged to the front frame by the levers or side pieces, I I, the occupant of the seat H can by shifting his person or weight backward on his seat raise up the front frame, so that instead of the runners or shoes, which are its ordinary supports, carrying said front frame, it is suspended to the rear frame at one end and to the horses' necks at its front end, and thus carried, in which position the weight is on the wheels and the horses' necks. Thus the tongue, too, becomes a lever through the intervention of a hinged joint between its point and the carrying-wheels, by which the management of the front frame is facilitated, and the entire operations of the machine put under the easy control of the person riding upon it.

Having thus fully described the nature and object of my invention, what I claim under this patent is—

1. In combination with a seed-planting machine that is operated by hand, the placing of both the driver and the person who operates the seed slides or valves upon the machine in such position as that each may attend to his particular duty without interfering with that of the other, substantially as described.

2. In combination with a seed-planting machine that is operated by hand, and upon which the driver and the person who works the seed slides or valves sit or stand, the so locating of said seats or stands as that the weight of one of the persons may be used to counterbalance or overbalance the weight of the other for the purpose of more readily raising or lowering the seeding apparatus, substantially as and for the purpose described.

GEO. W. BROWN.

Witnesses:
A. B. STOUGHTON,
E. COHEN.